(12) United States Patent
Morgan-Brown

(10) Patent No.: US 10,976,170 B2
(45) Date of Patent: Apr. 13, 2021

(54) ELECTRIC VEHICLE ROUTING SYSTEM

(71) Applicant: MORGAN BROWN CONSULTANCY LTD., Ipswich (GB)

(72) Inventor: David Morgan-Brown, Ipswich (GB)

(73) Assignee: Morgan Brown Consultancy Ltd., Ipswich (GB)

( * ) Notice: Subject to any disclaimer, the term of this patent is extended or adjusted under 35 U.S.C. 154(b) by 301 days.

(21) Appl. No.: 16/046,755

(22) Filed: Jul. 26, 2018

(65) Prior Publication Data

US 2019/0316924 A1 Oct. 17, 2019

(30) Foreign Application Priority Data

Apr. 16, 2018 (GB) ...................... 1806205

(51) Int. Cl.
*G01C 21/34* (2006.01)
*G01C 21/36* (2006.01)
(Continued)

(52) U.S. Cl.
CPC .......... *G01C 21/3476* (2013.01); *B60L 58/12* (2019.02); *G01C 21/3469* (2013.01);
(Continued)

(58) Field of Classification Search
CPC .............. G01C 21/34; G01C 21/3407; G01C 21/3476; G01C 21/3469; G01C 21/3676; G01C 21/3667; G01C 21/3679; G01C 21/3691; G01C 21/3692; G01C 21/3697; G01C 21/3617; B60L 58/12; B60L 2260/50; B60L 2260/52; B60L 2260/54; B60L 2260/56; B60L 2240/70; B60L 2240/72; B60L 53/00; B60L 53/10; B60L 53/20; B60L 53/30; B60L 53/50; B60L 53/60; B60L 53/80; B60W 20/12; G06N 20/00; Y02T 10/70; Y02T 10/7005; Y02T 10/72; Y02T 10/7208; Y02T 10/7258; Y02T 10/7275; Y02T 10/7283;
(Continued)

(56) References Cited

U.S. PATENT DOCUMENTS 5,815,824 A * 9/1998 Saga ..................... B60W 10/30
701/22
8,564,454 B2 * 10/2013 Oizumi ............. G01C 21/3697
340/901
(Continued)

*Primary Examiner* — Richard A Goldman
(74) *Attorney, Agent, or Firm* — Patterson + Sheridan, LLP

(57) ABSTRACT

An electric vehicle routing system comprising a route determination module configured to receive, via a graphical user interface (GUI) module, user input data defining, for a desired journey of a vehicle in which the vehicle routing system is installed, a start location in a road network, a destination location in the road network, and at least one waypoint in the road network. On the basis of the received user input data, data received from a vehicle battery status monitoring module, data retrieved from a road network storage database and data retrieved from a charging network storage database, the route determination module determines at least one route in the road network from the start location to the destination location via the at least one waypoint and transmits data associated with the at least one determined route to the GUI module.

44 Claims, 6 Drawing Sheets

(51) Int. Cl.
*B60L 58/12* (2019.01)
*G06N 20/00* (2019.01)

(52) U.S. Cl.
CPC ..... *G01C 21/3676* (2013.01); *G01C 21/3697* (2013.01); *G06N 20/00* (2019.01)

(58) Field of Classification Search
CPC ............ Y02T 10/7291; Y02T 10/7044; Y02T 10/705; Y02T 90/00; Y02T 90/10; Y02T 90/12; Y02T 90/14; Y02T 90/16; Y02T 90/121; Y02T 90/124; Y02T 90/125; Y02T 90/127; Y02T 90/128
USPC ......... 701/418, 22, 533, 400, 410, 119, 117, 701/123, 36, 408, 423, 537; 700/291; 320/109, 104, 162
See application file for complete search history.

(56) References Cited

U.S. PATENT DOCUMENTS

| | | | | |
|---|---|---|---|---|
| 8,612,140 B2* | 12/2013 | Gutman | ................. | G01C 21/00 701/410 |
| 9,335,179 B2* | 5/2016 | Penilla | ................ | G01C 21/3407 |
| 9,821,791 B2* | 11/2017 | Dextreit | ............ | B60W 50/0097 |
| 2005/0228553 A1* | 10/2005 | Tryon | ..................... | B60K 6/46 701/22 |
| 2008/0262667 A1* | 10/2008 | Otabe | .................. | B60W 10/26 701/22 |
| 2009/0107743 A1* | 4/2009 | Alston | .................... | H02J 7/342 180/65.21 |
| 2010/0286909 A1* | 11/2010 | Tate, Jr. | ............. | G01C 21/3446 701/533 |
| 2011/0022260 A1* | 1/2011 | Ichikawa | ............... | B60K 6/445 701/22 |
| 2011/0241824 A1* | 10/2011 | Uesugi | ................... | B60L 53/67 340/5.8 |
| 2012/0158299 A1* | 6/2012 | Cerecke | ............ | G01C 21/3469 701/533 |
| 2012/0173134 A1* | 7/2012 | Gutman | ............. | G01C 21/3476 701/400 |
| 2012/0173135 A1* | 7/2012 | Gutman | ............. | G01C 21/3469 701/408 |
| 2013/0006677 A1* | 1/2013 | Anglin | ................... | B60L 53/32 705/5 |
| 2013/0046457 A1* | 2/2013 | Pettersson | .......... | G01C 21/3469 701/117 |
| 2013/0204525 A1* | 8/2013 | Pfeifle | ................ | G01C 21/3492 701/533 |
| 2013/0261953 A1* | 10/2013 | Kiyama | ............. | G01C 21/3476 701/400 |
| 2013/0342310 A1* | 12/2013 | Park | ....................... | B60L 58/30 340/5.7 |
| 2013/0345945 A1* | 12/2013 | Fischer | ................... | B60L 53/60 701/102 |
| 2014/0107913 A1* | 4/2014 | Vicharelli | .......... | G01C 21/3469 701/123 |
| 2014/0156108 A1* | 6/2014 | Reich | ................. | G01C 21/3682 701/1 |
| 2014/0163877 A1* | 6/2014 | Kiyama | .................. | B60L 58/12 701/533 |
| 2014/0278103 A1* | 9/2014 | Daikoku | ............ | G01C 21/3469 701/533 |
| 2014/0288743 A1* | 9/2014 | Hokoi | ................... | B60W 10/06 701/22 |
| 2015/0045985 A1* | 2/2015 | Yenamandra | ...... | G01C 21/3697 701/1 |
| 2015/0066258 A1* | 3/2015 | Loftus | ................. | B60L 11/1861 701/22 |
| 2015/0073636 A1* | 3/2015 | Machino | ........... | G01C 21/3605 701/22 |
| 2015/0226572 A1* | 8/2015 | North | ...................... | B60L 53/67 701/400 |
| 2015/0241233 A1* | 8/2015 | Loftus | ............... | G01C 21/3469 701/410 |
| 2015/0266379 A1* | 9/2015 | Bellin | .................... | B60K 35/00 701/36 |
| 2015/0291047 A1* | 10/2015 | Saito | .................... | B60L 11/1824 320/109 |
| 2015/0354974 A1* | 12/2015 | Takehara | ........... | G01C 21/3407 701/423 |
| 2016/0003631 A1* | 1/2016 | Sund | .................. | G01C 21/3492 701/119 |
| 2016/0084662 A1* | 3/2016 | Thompson | ........... | G01C 21/343 701/533 |
| 2017/0088000 A1* | 3/2017 | Payne | ..................... | B60L 58/12 |
| 2018/0045533 A1* | 2/2018 | Jackson | ............ | G01C 21/3682 |
| 2018/0157963 A1* | 6/2018 | Salti | ...................... | G06N 3/0454 |
| 2019/0157882 A1* | 5/2019 | Sherback | .............. | H02J 7/0027 |
| 2019/0178663 A1* | 6/2019 | Mukai | ................ | G01C 21/3476 |
| 2019/0263288 A1* | 8/2019 | Nasu | ................ | G01C 21/3438 |
| 2019/0294173 A1* | 9/2019 | Szubbocsev | .......... | B60L 58/12 |
| 2019/0316924 A1* | 10/2019 | Morgan-Brown | .......................... G01C 21/3676 |
| 2020/0164855 A1* | 5/2020 | Hashimoto | ........... | B60W 20/10 |

\* cited by examiner

ELECTRIC VEHICLE ROUTING SYSTEM

CROSS-REFERENCE TO RELATED APPLICATIONS

This application claims priority under 35 USC § 119 to United Kingdom (GB) Application No. 1806205.9, filed on Apr. 16, 2018, the disclosure of which is incorporated herein by reference in its entirety.

INTRODUCTION

Technical Field

The present disclosure relates to vehicle routing. In particular, but not exclusively, the present disclosure relates to electric vehicle routing systems.

BACKGROUND

There has been a broad move globally towards reducing the emissions of vehicles, which has been spurred by the need to create healthier cities and to tackle the environmental impact of travel. There have been a number of technologies developed to reduce emissions, such as hybrid drivetrains, all-electric vehicles and hydrogen cells. The following countries have already legislated against all internal combustion engine sales (including internal combustion hybrid drivetrains):

Norway in 7 years
Netherland, Germany and India in 12 years
Scotland in 14 years
England, Wales and France in 22 years Currently, more than 99% of zero emission vehicles sold globally are all-electric vehicles with less than half a percent being hydrogen cell based.

It is likely that over the next 5 to 20 years the adoption of electric vehicles will surge to become the dominant choice. Currently, the infrastructure to support recharging of electric vehicles is sparse and fragmented. There are few 'fast' chargers, and those are still far from fast compared to conventional refueling and tend to be tied to certain car marques. Despite the continued roll out of new charging infrastructure it is likely that the difficulty in navigating the charging network will remain a barrier to the widespread adoption and use of electric vehicles for some time to come.

As the charging network becomes more prevalent and electric vehicle ranges increase, being able to effortlessly and reliably plan trips through the charging network will remain critically important for the adoption of cheaper, lower range vehicles.

Even once charging infrastructure is as fast and as prevalent as current petrol stations, effective route finding will still play a role in improving the energy efficiency of the entire vehicle fleet.

Effective and accurate charge based routing is important for human drivers, and even more so for autonomous driving.

SUMMARY

According to a first aspect of the present disclosure, there is provided an electric vehicle routing system comprising: a route determination module; an electric vehicle battery status monitoring module; a road network storage database for storing data associated with a road network; a charging network storage database for storing data associated with a plurality of electric vehicle battery charging locations in the road network; and a graphical user interface (GUI) module, the route determination module being configured to: receive, via the GUI module, user input data defining, for a desired journey of a vehicle in which the vehicle routing system is installed, a start location in the road network, a destination location in the road network, and at least one waypoint in the road network; receive, from the vehicle battery status monitoring module, at least one parameter associated with a status of a battery of the vehicle; retrieve data from the road network storage database; retrieve data from the charging network storage database; on the basis of the received user input data, the data received from the vehicle battery status monitoring module, the data retrieved from the road network storage database and the data retrieved from the charging network storage database, determine at least one route in the road network from the start location to the destination location via the at least one waypoint; and transmit data associated with the at least one determined route to the GUI module, the transmitted data being operable to cause the GUI module to display data indicative of the at least one determined route.

According to a second aspect of the present disclosure, there is provided a method of operating an electric vehicle routing system, the system comprising: a route determination module; an electric vehicle battery status monitoring module; a road network storage database for storing data associated with a road network; a charging network storage database for storing data associated with a plurality of electric vehicle battery charging locations in the road network; and a graphical user interface (GUI) module, the method comprising, at the route determination module: receiving, via the GUI module, user input data defining, for a desired journey of a vehicle in which the vehicle routing system is installed, a start location in the road network, a destination location in the road network, and at least one waypoint in the road network; receiving, from the vehicle battery status monitoring module, at least one parameter associated with a status of a battery of the vehicle; retrieving data from the road network storage database; retrieving data from the charging network storage database; on the basis of the received user input data, the data received from the vehicle battery status monitoring module, the data retrieved from the road network storage database and the data retrieved from the charging network storage database, determining at least one route in the road network from the start location to the destination location via the at least one waypoint; and transmitting data associated with the at least one determined route to the GUI module, the transmitted data being operable to cause the GUI module to display data indicative of the at least one determined route.

According to a third aspect of the present disclosure, there is provided a non-transitory computer-readable medium comprising a set of instructions, which, when executed by a processor of a computerized device, cause the computerized device to perform a method of operating an electric vehicle routing system, the system comprising: a route determination module; an electric vehicle battery status monitoring module; a road network storage database for storing data associated with a road network; a charging network storage database for storing data associated with a plurality of electric vehicle battery charging locations in the road network; and a graphical user interface (GUI) module, the method comprising, at the route determination module: receiving, via the GUI module, user input data defining, for a desired journey of a vehicle in which the vehicle routing system is installed, a start location in the road network, a destination location in the road network, and at least one waypoint in the road network; receiving, from the vehicle battery status monitoring module, at least one parameter associated with a status of a battery of the vehicle; retrieving data from the road network storage database; retrieving data from the charging network storage database; on the basis of the received user input data, the data received from the vehicle battery status monitoring module, the data retrieved from the road network storage database and the data retrieved from the charging network storage database, determining at least one route in the road network from the start location to the destination location via the at least one waypoint; and transmitting data associated with the at least one determined route to the GUI module, the transmitted data being operable to cause the GUI module to display data indicative of the at least one determined route.

According to a fourth aspect of the present disclosure, there is provided an electric vehicle routing system comprising: a route determination module; an electric vehicle battery status monitoring module; a road network storage database for storing data associated with a road network; a charging network storage database for storing data associated with a plurality of electric vehicle battery charging locations in the road network; and a graphical user interface (GUI) module, the route determination module being configured to: receive, via the GUI module, user input data defining, for a desired journey of a vehicle in which the vehicle routing system is installed, a start location in the road network, and a destination location in the road network; receive, from the vehicle battery status monitoring module, at least one parameter associated with a status of a battery of the vehicle, the at least one received parameter indicating a current temperature of the battery; retrieve data from the road network storage database; retrieve data from the charging network storage database; on the basis of the received user input data, the data received from the vehicle battery status monitoring module, the data retrieved from the road network storage database and the data retrieved from the charging network storage database, determine at least one route in the road network from the start location to the destination location; and transmit data associated with the at least one determined route to the GUI module, the transmitted data being operable to cause the GUI module to display data indicative of the at least one determined route.

According to a fifth aspect of the present disclosure, there is provided an electric vehicle routing system comprising: a route determination module; an electric vehicle battery status monitoring module; a road network storage database for storing data associated with a road network; a charging network storage database for storing data associated with a plurality of electric vehicle battery charging locations in the road network; and a graphical user interface (GUI) module, the route determination module being configured to: receive, via the GUI module, user input data defining, for a desired journey of a vehicle in which the vehicle routing system is installed, a start location in the road network, and a destination location in the road network; receive, from the vehicle battery status monitoring module, at least one parameter associated with a status of a battery of the vehicle; retrieve data from the road network storage database; retrieve data from the charging network storage database; on the basis of the received user input data, the data received from the vehicle battery status monitoring module, the data retrieved from the road network storage database and the data retrieved from the charging network storage database, determine at least one route in the road network from the start location to the destination location; and transmit data associated with the at least one determined route to the GUI module, the transmitted data being operable to cause the GUI module to display data indicative of the at least one determined route.

According to a sixth aspect of the present disclosure, there is provided a device for determining routes in a road network, the device comprising: a route determination module; a wireless transceiver; and a graphical user interface (GUI) module, the GUI module being configured to receive user input data defining, for a desired journey, a start location in the road network and a destination location in the road network, the wireless transceiver being configured to: receive, at least one parameter associated with a status of a battery of a vehicle; receive data from a road network storage database; and receive data from a charging network storage database associated with a plurality of electric vehicle battery charging locations in the road network, the route determination module being configured to: on the basis of the received user input data, the received at least one vehicle battery status parameter, the data received from the road network storage database and the data received from the charging network storage database, determine at least one route in the road network from the start location to the destination location; and provide data associated with the at least one determined route to the GUI module, the provided data being operable to cause the GUI module to display data indicative of the at least one determined route.

Features described in relation to one embodiment of the present disclosure may be incorporated into other embodiments of the present disclosure. For example, the method of one or more embodiments may incorporate any of the features described with reference to the apparatus of one or more embodiments and vice versa.

DESCRIPTION OF THE DRAWINGS

Embodiments of the present disclosure will now be described by way of example only with reference to the accompanying drawings of which.

DETAILED DESCRIPTION

Figure 1:
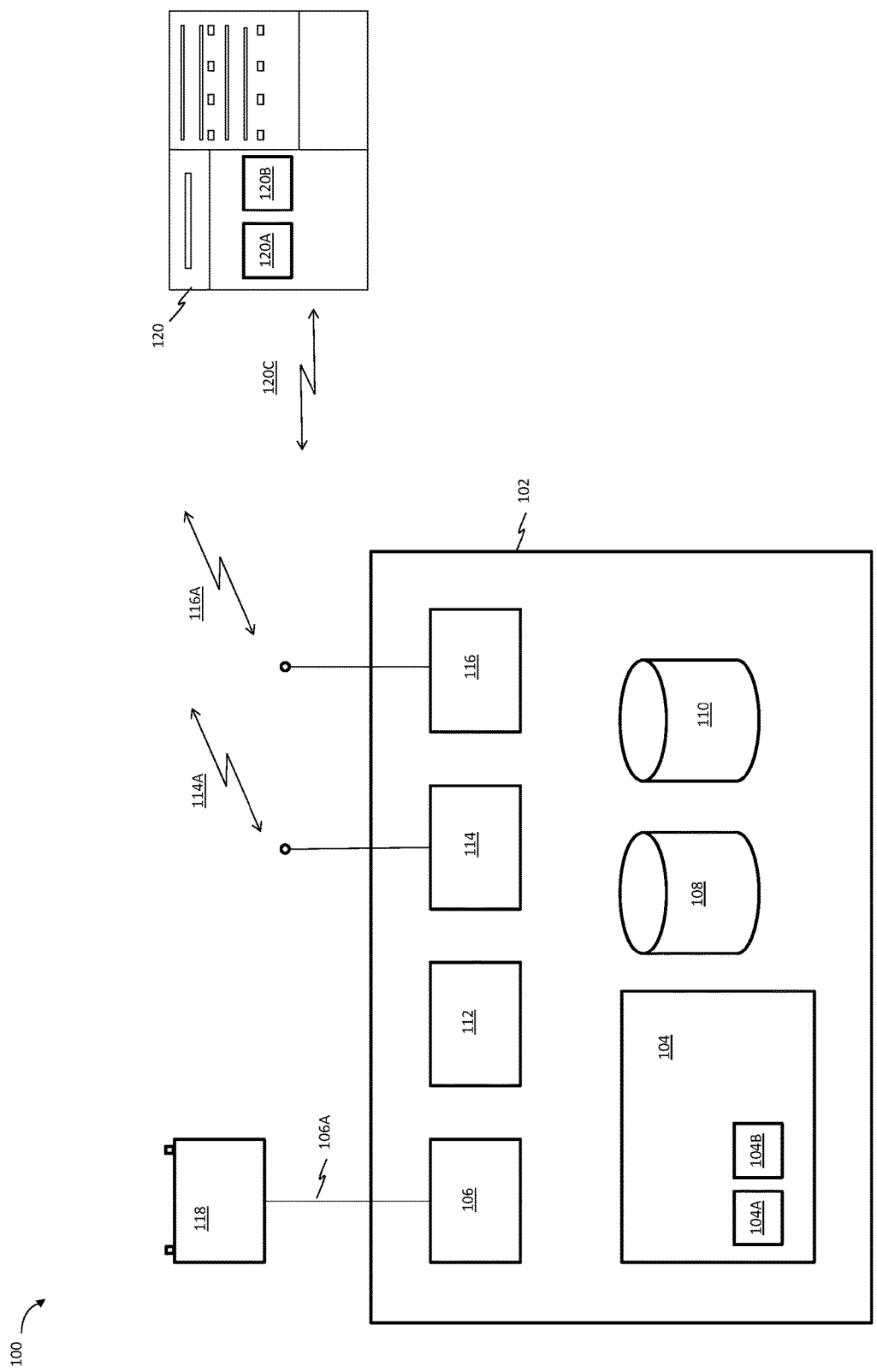
FIG. 1 shows a system diagram according to embodiments.

FIG. 1 shows a system diagram according to embodiments. FIG. 1 depicts a system 100 comprising an electric vehicle routing system 102, an electric vehicle battery 118 and a server 120.

Electric vehicle routing system 102 comprises a route determination module 104, an electric vehicle battery status monitoring module 106, a road network storage database 108, a charging network storage database 110, a graphical user interface (GUI) module 112, a Global Positioning System (GPS) module 114, and a wireless network transceiver 116. Data communication between the various components/modules of electric vehicle routing system 102 is facilitated via one or more data links/busses (not shown) connecting the components/modules to each other.

In embodiments, electric vehicle routing system 102 is installed in an electric vehicle (not shown). An electric motor of the electric vehicle is powered by electric vehicle battery 118. Electric vehicle battery status monitoring module 106 monitors the current charge energy of electric vehicle battery 118 via link 106A and provides data associated with a status of electric vehicle battery 118 to route determination module 104.

Road network storage database 108 stores data associated with a road network, for example data defining road names, road intersections, road distances, road types, etc. for roads within one or more territorial limits such as the United Kingdom road network.

Charging network storage database 110 stores data associated with a plurality of electric vehicle battery charging locations in the road network, for example locations in the road network where one or more charging stations offer charging facilities for electric vehicle batteries.

Route determination module 104 comprises electronic circuitry (not shown), one or more processors 104A and one or more memories 104B for providing data processing and data storage capabilities in relation to embodiments, for example embodiments involving determining routes for an electric vehicle through the road network.

GUI module 112 provides a display capability for displaying data/information to a user of electric vehicle routing system 102. In embodiments where electric vehicle routing system 102 is installed in an electric vehicle, the user may for example be the driver of the vehicle or a passenger in the vehicle. GUI module 112 may comprise an interface which allows for capture of user input, for example a touch-screen user interface or a voice interface, for example enabling a user to specify a destination in the road network they would like to travel to in the electric vehicle. A user may also specify one or more waypoints to be visited en route. Waypoints are places that a user would like to stop at during their journey to the destination, for example where a hotel for the night is located, where a preferred restaurant for lunch is located, etc. In general, a user would not specify electric vehicle battery charging locations as waypoints.

GPS module 114 provides electric vehicle routing system 102 with functionality to locate and track the geographical positioning of an electric vehicle in which electric vehicle routing system 102 is installed via a wireless link communication 114A with a GPS satellite network (not shown). The geographical positioning can then be used to identify a location of the vehicle in the road network.

Wireless network transceiver 116 provides electric vehicle routing system 102 with functionality to communicate wirelessly via one or more wireless communication links 116A with one or more networks (not shown), for example mobile telephony ('cellular') networks, radio networks (such as for receiving Radio Data System (RDS) data on current road network traffic conditions), Wi-fi networks, the Internet, etc.

In embodiments, server 120 provides support services to electric vehicle routing system 102 via a wireless communication link 120C. Server 120 comprises one or more processors 120A and one or more memories 120B for use in providing support services to electric vehicle routing system 102.

One example support service is a road network data update service for providing updates on the road network such as new roads, road closures, etc.

Another example support service is a road network traffic conditions service which dynamically notifies electric vehicle routing system 102 of traffic jams, roadworks, etc. in the road network.

Another example support service is an electric vehicle battery charging location update service, for example for notifying electric vehicle routing system 102 of new charging locations in the road network. The electric vehicle battery charging location update service can also notify electric vehicle routing system 102 of updates in charging facilities, for example an increase in number of charging outlets at charging locations, or an upgrade (for example from slow chargers to fast chargers) to charging outlets. The electric vehicle battery charging location update service may also dynamically notify electric vehicle routing system 102 of current waiting times at charging locations.

In embodiments, route determination module 104 is configured to receive, via GUI module 112, user input data defining, for a desired journey of a vehicle in which the vehicle routing system is installed, a start location in the road network, a destination location in the road network, and at least one waypoint in the road network. Route determination module 104 is configured to receive, from vehicle battery status monitoring module 106, at least one parameter associated with a status of a battery of the vehicle, retrieve data from road network storage database 108, and retrieve data from charging network storage database 110. Route determination module 104 is configured to, on the basis of the received user input data, the data received from vehicle battery status monitoring module 106, the data retrieved from road network storage database 108 and the data retrieved from charging network storage database 110, determine at least one route in the road network from the start location to the destination location via the at least one waypoint. Route determination module 104 is configured to transmit data associated with the at least one determined route to GUI module 112. The data transmitted data to GUI module 112 is operable to cause GUI module 112 to display data indicative of the at least one determined route. A user is then able to follow the displayed at least one determined route in the electric vehicle.

The at least one parameter associated with a status of a battery of the vehicle received from vehicle battery status monitoring module 106 may for example comprise a parameter associated with a current charge energy of the vehicle battery, a current temperature of the vehicle battery, a difference from full charge energy of the vehicle battery, a difference from zero charge energy of the vehicle battery, a difference from a minimum allowed charge energy of the vehicle battery, etc. Multiple parameters associated with the battery of the vehicle may be received from vehicle battery status monitoring module 106 and used by route determination module 104 to determine at least one route in the road network from the start location to the destination location via the at least one waypoint.

Figure 2A:
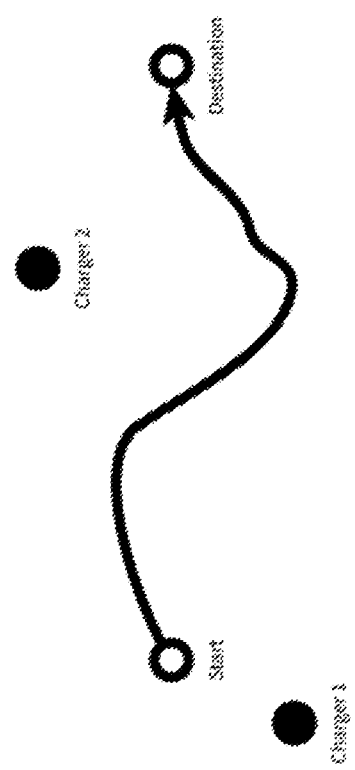
FIG. 2A shows a route plan according to embodiments.

FIG. 2A shows a route plan according to embodiments. The example route plan depicted in FIG. 2A shows a user who wants to travel from a start location to a destination location. Two potential charging locations (Charger 1, Charger 2) are shown. Initially, an optimal route is determined from the start location to the destination location, for example using a conventional route finding algorithm such as Dijkstra, A*, etc.

Figure 2B:
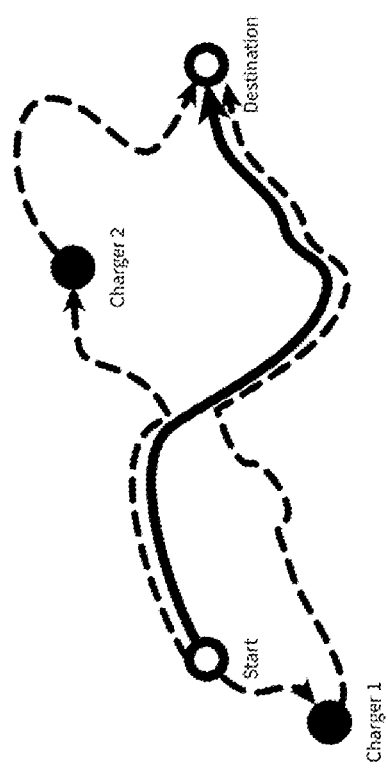
FIG. 2B shows a route plan according to embodiments.

FIG. 2B shows a route plan according to embodiments. An optimal path from the start location to each charger and from each charger to the destination location is determined as depicted in FIG. 2B. In embodiments, the determining comprises first determining at least one first path from the start location to one or more electric vehicle battery charging locations in the plurality of electric vehicle battery charging locations. In embodiments, the determining comprises second determining at least one second path from one or more electric vehicle battery charging locations in the plurality of electric vehicle battery charging locations to the destination location. In embodiments, an electric vehicle battery charging location is defined as a function which returns the time required to get from say a charge a to say a charge b.

Figure 2C:
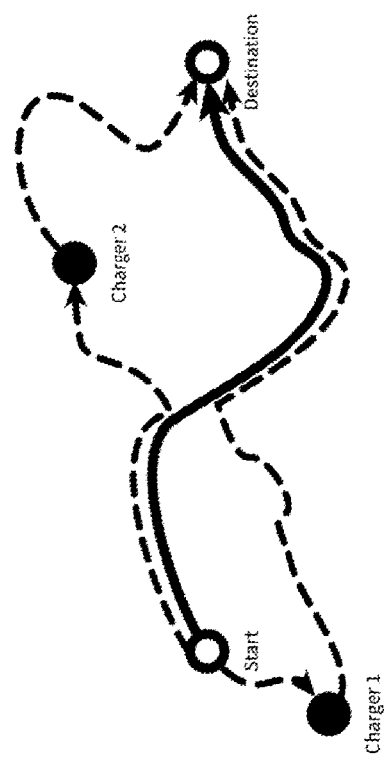
FIG. 2C shows a route plan according to embodiments.

FIG. 2C shows a route plan according to embodiments. An optimal route from each charger to the other is determined as depicted in FIG. 2C. In embodiments, the determining comprises third determining at least one third path from one or more electric vehicle battery charging locations in the plurality of electric vehicle battery charging locations to one or more other electric vehicle battery charging locations in the plurality of electric vehicle battery charging locations.

Figure 2D:
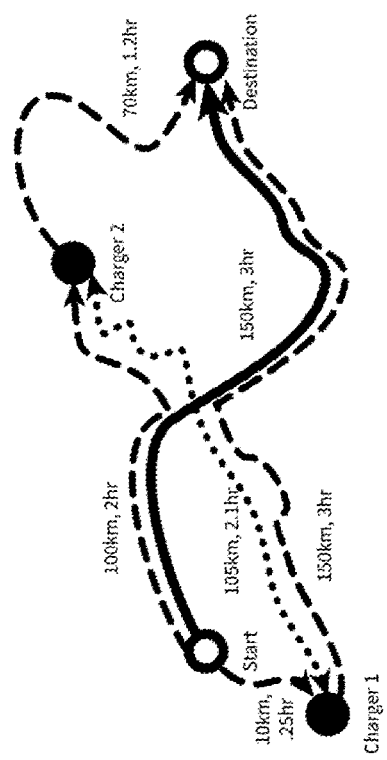
FIG. 2D shows a route plan according to embodiments.

FIG. 2D shows a route plan according to embodiments. One or more cost parameter details (or 'physical cost parameters') are then associated with each path which can be used in the calculation of the energy used to traverse them. The example embodiments of FIG. 2D depict just distance and time costs parameters for simplicity, but any number of other costs parameters may additionally or alternatively be employed. In embodiments, the determining comprises associating one or more cost parameters with the at least one first path, the at least one second path and the at least one third path. The one or more cost parameters for a given path may for example comprise one or more of a distance travelled, a time taken, an elevation change, a distance travelled in one or more compass directions, an energy saving parameter associated with an induction charging road, etc.

Figure 2E:
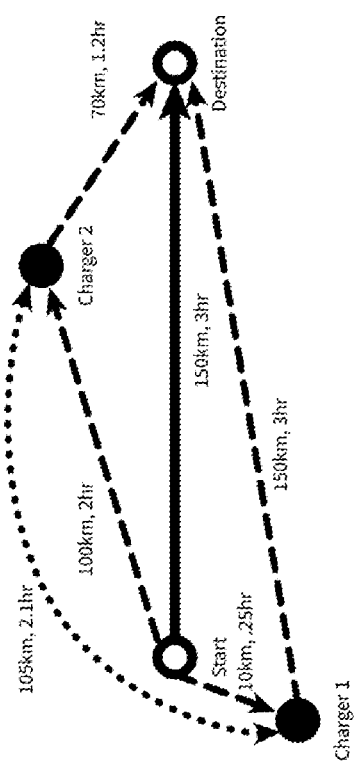
FIG. 2E shows a node network according to embodiments.

FIG. 2E shows a node network according to embodiments. The details of each path are temporarily disregarded and the route plan is represented as a network of nodes (or graph) where each node (or vertex) is the start location, the destination location or a charging location, and each edge between nodes of the node network is the distance, time, etc. to traverse between nodes as depicted in FIG. 2E. In embodiments, the determining comprises representing the start location, one or more of the electric vehicle battery charging locations in the plurality of electric vehicle battery charging locations and the destination location as nodes in a node network with paths between each node. In embodiments, the determining comprises calculating a minimum cost metric from the start location node to one or more other nodes in the node network by traversing paths in the node network from the start location node to the one or more other nodes in the node network. In embodiments, the calculating comprises accumulating the one or more cost parameters associated with each traversed path.

In the paragraphs above describing the embodiments of FIGS. 2B to 2E, one or more charging locations/nodes are referred to. In various embodiments, the number of charging locations/nodes which are included in the one or more charging locations/nodes varies from a subset of all other charging locations/nodes to all of the other charging locations/nodes. The subset may just include a single charging locations/node or may include multiple charging locations/nodes. In some embodiments, one or more reachability heuristics are employed to limit the number/extent of the one or more charging locations/nodes; one such example heuristic could be nodes within a certain Euclidean distance of a theoretical maximum range.

The minimum cost from the start location node to other nodes is calculated by accumulating the current energy of the vehicle, the energy consumed and the energy charged as the node network is iterated through, for example using a breadth first search. In embodiments, the calculating comprises accumulating a plurality of cost parameters for each traversed path. In embodiments, the calculating is carried out at least in part using a breadth first search process for each cost parameter.

The calculating may for example be described by the following pseudocode:

```
activeVertices = [startVertex]
results = [startVertex -> Cost(startEnergy)]
while activeVertices is not empty:
    currentVertext =
            activeVertices with lowest cost in results
    remove currentVertex from activeVertices
    currentCost = results[currentVertex]
    steps = find reachable steps from currentVertex
            given current currentCost charge and energy
            profile of vehicle
    for each step:
        costToStep = step cost + currentCost
        if costToStep is more optimal than in current
                results for step destination
        or there is no existing results for step
                destination then:
            add the destination to activeVertices
            set the cost for step destination in
                    results to the costToStep
```

In embodiments, the calculating is carried out at last in part on an initial charge energy of the battery of the vehicle. In embodiments, the calculating comprises calculating a decrease in charge energy of the battery of the vehicle due to charge energy consumed when traversing each path. In embodiments, the calculating comprises calculating an increase in charge energy of the battery of the vehicle due to charge energy added when charging the battery at each respective electric vehicle battery charging location. In embodiments, the calculating comprises identifying which path traversals are on the lowest cost route from the start location node to each other node in the node network.

In embodiments, the calculating is carried out at least on the basis of one or more parameters associated with a current state of the vehicle. The one or more parameters associated with a current state of the vehicle comprise one or more of vehicle battery temperature, elevation change, wind direction, and ambient temperature.

In embodiments, the calculating comprises dynamically calculating which path traversals are viable and which path traversals are not viable and pruning path traversals which are not viable from the node network.

In embodiments, the dynamic calculating comprises, for each path traversal from a given electric vehicle battery charging location node, first calculating whether the charge energy consumed traversing from the given electric vehicle battery charging location node to a given other node is greater than the maximum charge energy of the electric vehicle battery minus a minimum allowed charge energy for the electric vehicle battery, and in response to a positive first calculation, concluding that the respective path traversal is not viable.

In embodiments, in response to a negative first calculation, the dynamic calculating comprises second calculating whether the charge energy consumed traversing from the given electric vehicle battery charging location node to the given other node is lower than a current predicted charge energy of the electric vehicle battery minus the minimum allowed charge energy for the electric vehicle battery, and in response to a positive second calculation, concluding that the respective path traversal is viable without charging.

In embodiments, in response to a negative second calculation, the dynamic calculating comprises concluding that the respective path traversal is viable with a cost equal to the cost of charging the electric vehicle battery with the minimum charge energy required for reaching the given other node from the given electric vehicle battery charging location node plus the charge energy consumed traversing from the given electric vehicle battery charging location node to the given other node.

Some embodiments may not produce an optimal route where the route contains at least one fast charger which does not give the vehicle enough range to reach the destination followed subsequently by a slower charger. Whilst embodiments will still find a route to the destination, it may be slower than if the vehicle had charged fully at the faster charger before proceeding to the slower charger. This particular scenario can be avoided by modifying the dynamic calculating such that instead of employing the following pseudocode:

```
...
there is a viable route whose cost is
the edge cost plus the cost to charge
for the minimum amount of time necessary
to reach the target vertex
...
``` the following pseudocode is used instead:

```
...
there is a viable route whose cost is
the edge cost plus the cost to charge
for the minimum amount of time necessary
to reach the target vertex plus another
viable route to a copy of the target
whose cost is the edge cost plus the
cost to charge fully when the target
is a slower charger
...
```

In embodiments, the given electric vehicle battery charging location node is associated with a relatively fast charger and the given other node is associated with a relatively slow charger; in such embodiments, in response to a negative second calculation, the dynamic calculating comprises creating an additional node in the node network comprising a copy of the given other node, creating an additional viable path in the node network from the given electric vehicle battery charging location node to the additional node, and allocating, to the additional viable path, a cost equal to the cost of charging the vehicle battery to full charge energy plus the charge energy consumed traversing from the given electric vehicle battery charging location node to the given other node.

In embodiments, the dynamic calculating comprises, for each path traversal from a given non-electric vehicle battery charging location node, third calculating whether the charge energy consumed traversing from the given non-electric vehicle battery charging location node to another node is greater than a current predicted charge energy of the electric vehicle battery minus the minimum allowed charge energy for the electric vehicle battery, and in response to a positive third calculation, concluding that the respective path traversal is not viable, and in response to a negative third calculation, concluding that the respective path traversal is viable.

In embodiments, the minimum allowed charge energy for the electric vehicle battery is defined according to received user input data. The input data may be received from a user via GUI module 112. The minimum allowed charge energy may be entered by a user per journey or may be entered for multiple or all journeys by a user and stored in memory 104B. The minimum allowed charge energy may for example comprise 10% or 5% of the full charge energy of electric vehicle battery 118. The minimum allowed charge energy may for example default to a value such as 2%, 1% or 0%.

In embodiments, the calculating is carried out at least in part on a predicted time taken to wait for a vehicle battery charger to become available at a respective electric vehicle battery charging location. In embodiments, the cost to charge includes a prediction of the time taken to wait for a charger to become available. This prediction can be based upon the start time of the trip plus the estimate of the time to reach the charging node based upon the steps taken to reach it. This prediction could include live data from server 120 which may receive data from currently planned trips from all users and combines this with historic data on usage and wait times at each charger.

In embodiments, the dynamic calculating comprises allocating a cost penalty for each electric vehicle battery charging location node which is traversed. In embodiments, the cost includes an arbitrary penalty for the number of chargers visited where the controller of the vehicle would prefer a slightly longer trip with fewer stops. So, for example, the cost comparison could include a 15 minute penalty for each charge stop when assessing which route is optimal, meaning that a single 40 minute charge stop would be favored over two 15 minute stops.

In embodiments, dynamically calculating the reachable steps from a node involves identifying all of the nodes connected to that node and performing the steps described by the following pseudocode:

```
travelEnergy = energy consumed traversing this edge
minimumAllowedChargeEnergy = lowest configured energy
    for the target vertex type
if the vertex is a charger vertex then:
    if the travelEnergy is greater than the
            maximum charge of the vehicle minus the
            minimumAllowedChargeEnergy then there is
            no viable route
    else if the travelEnergy is greater than
            current predicted charge of the vehicle
            minus the minimumAllowedChargeEnergy then
            this route is viable without charging
    else there is a viable route whose cost is
            the edge cost plus the cost to charge
            for the minimum amount of time necessary
            to reach the target vertex
else:
    if the travelEnergy is greater than the
            current predicted charge of the vehicle
            minus the minimumAllowedChargeEnergy then
            there is no viable route
    else this route is viable.
```

In embodiments, the travel energy can be calculated using the current accumulated state of the vehicle which can include, for example, an estimate of the battery temperature, details of elevation changes, wind direction, outside temperature, etc. Embodiments may assume that charge rate is either linear or will be slower when the battery is more fully charged.

In embodiments, the determining comprises determining a range of steps from the source node to copies of the target node with different time costs based upon different maximum speeds, for example if speed is limited to 50 mph the travel time will be longer but the energy used will be reduced. Such embodiments are able to take into account driving at lower maximum speeds to find routes where small increases in travel time produce shorter overall routes by reducing or avoiding charging.

In embodiments, the determining comprises determining alternative routes between the source node to the target node which have different physical characteristics which affect the energy used and the time taken.

In embodiments, the determining comprises determining routes where travelling more slowly on certain steps or taking slower, more energy efficient routes takes less time overall because it minimizes or avoids charging stops.

In embodiments, the determining comprises determining a plurality of paths from the source location node to one or more copies of the destination location node with different time costs based upon one or more maximum speeds at which the vehicle should not exceed. In embodiments, the one or more maximum speeds are lower than the legal speed limit for at least a part of the plurality of paths. The one or more maximum speeds may for example comprise 40 mph, 50 mph and 60 mph on a path or portion of path where the legal speed limit is 70 mph. The one or more maximum speeds may be configured into the system as default parameters. The one or more maximum speeds may be user-configurable. Wind resistance is generally lower at lower speeds, so travelling at a lower speed for at least a portion of a journey may consume less charge energy of the vehicle battery; this may in turn allow a charging stop to be avoided on a journey and lead to a lower overall journey time, despite the vehicle travelling slower than allowed/possible on at least a portion of the journey.

Waypoint nodes can be incorporated in embodiments by creating copies of all charge nodes dynamically based upon the number of waypoint nodes already visited. With waypoint nodes, the possible routes from a given node are the next waypoint node or the destination location node if no more waypoints, or any charging node. By dynamically traversing the node network in this manner, embodiments will explore all possible routes via waypoints and charging nodes.

In embodiments where the route includes one or more waypoints, when assembling the next steps from the current node, some embodiments may consider, steps to the destination location node via all remaining waypoints, steps to the charging nodes via one or more of the remaining waypoints, steps directly to copies of the charging nodes marked with the number of waypoints remaining to reach the destination location node or to the number of waypoints passed so far. An alternative marking system may involve marking the nodes with some form of labelling system, for example using a numerical or alphabetical sequence or a hashing operation or suchlike. In embodiments, the cost calculation may comprise calculating the cost of reaching the current node in addition to the cost of traversing via any waypoints.

In embodiments, the determining comprises representing the at least one waypoint as a node in the node network, and fourth determining at least one fourth path to the destination location node via the at least one waypoint node. In embodiments, the determining comprises fifth determining at least one fifth path to one or more of the electric vehicle battery charging location nodes via the at least one waypoint node.

In embodiments, the determining comprises creating one or more copies of one or more charge nodes dynamically based upon whether the at least waypoint node has been traversed or not, and sixth determining at least one sixth path to one or more other nodes from the one or more copies of the one or more charge nodes.

In embodiments, the received user input data defines a plurality of waypoints, and the determining comprises representing one or more other waypoints in the plurality of waypoints as nodes in the node network, and seventh determining at least one seventh path from the at least one waypoint node to the one or more other waypoint nodes.

In embodiments, the network of charging nodes and the physical edge costs between them changes rarely and can be calculated in advance and used repeatedly because the physical distance, time taken, elevation changes, etc. are substantially fixed. This set of pre-calculated attributes can be recalculated periodically to take into account changes to the route, for example due to traffic or road closures. This representation of the physical nature of all of the interconnecting routes between chargers can be calculated and updated centrally, for example by server 120, and then delivered to each device (such as electric vehicle routing system 102) producing the actual trip route calculations. Alternatively, or in addition, a set of data can be pre-calculated for different times so that it could reflect predicted changes in time taken and speed between peak and non-peak times. Such pre-calculated data can be represented in a compact form such as a series of dense matrices representing each of the physical properties, or in some other form such as a map from each charging node to each other. In embodiments, the pre-calculated data in stored in route determination module 104, for example in one or more memories 104B.

In embodiments, route determination module 104 is configured to, prior to receipt of the user input data, perform at least a part of the determining and/or calculating in advance and using at least a part of the results of the advance determining and/or calculating in the determining and/or calculating performed after receipt of the user input data.

In embodiments, route determination module 104 comprises a sub-processing component in the form of a fitness function. The fitness function determines whether the cost of one particular set of steps is superior to another. The fitness function can just involve identifying whether the time taken is lower, but can include other factors such as the total energy used, number of charge stops, monetary cost, etc. Ultimately though, the fitness function determines whether the cost of one particular set of steps is more optimal than another.

In embodiments, route determination module 104 comprises a sub-processing component in the form of an actual cost function. In embodiments, the actual cost function is responsible for calculating the actual cost from the vehicles current state when the vehicle takes a physical step. The actual cost function can also consider external factors in its calculation such as prevailing wind speed/direction, temperature, previous information on the efficiency of the driver, etc. In embodiments, the actual cost is calculated using the current state of the vehicle such as starting charge, battery temperature, etc. combined with the effect of performing the step.

In embodiments, route determination module 104 comprises a sub-processing component in the form of a charge cost function. In embodiments, the charge cost function calculates the cost of charging the vehicle from one amount of charge energy to another. This cost can include waiting time, charging time, monetary cost, etc. Each charge node can have its own independent charge cost function. The charge cost function accounts for different vehicles which may, for example, not be able to consume all of the delivered power or may only be compatible with lower power outlets or different power outlet types on the charger (for example, alternating current (AC) only, or direct current (DC) only).

Figure 3:
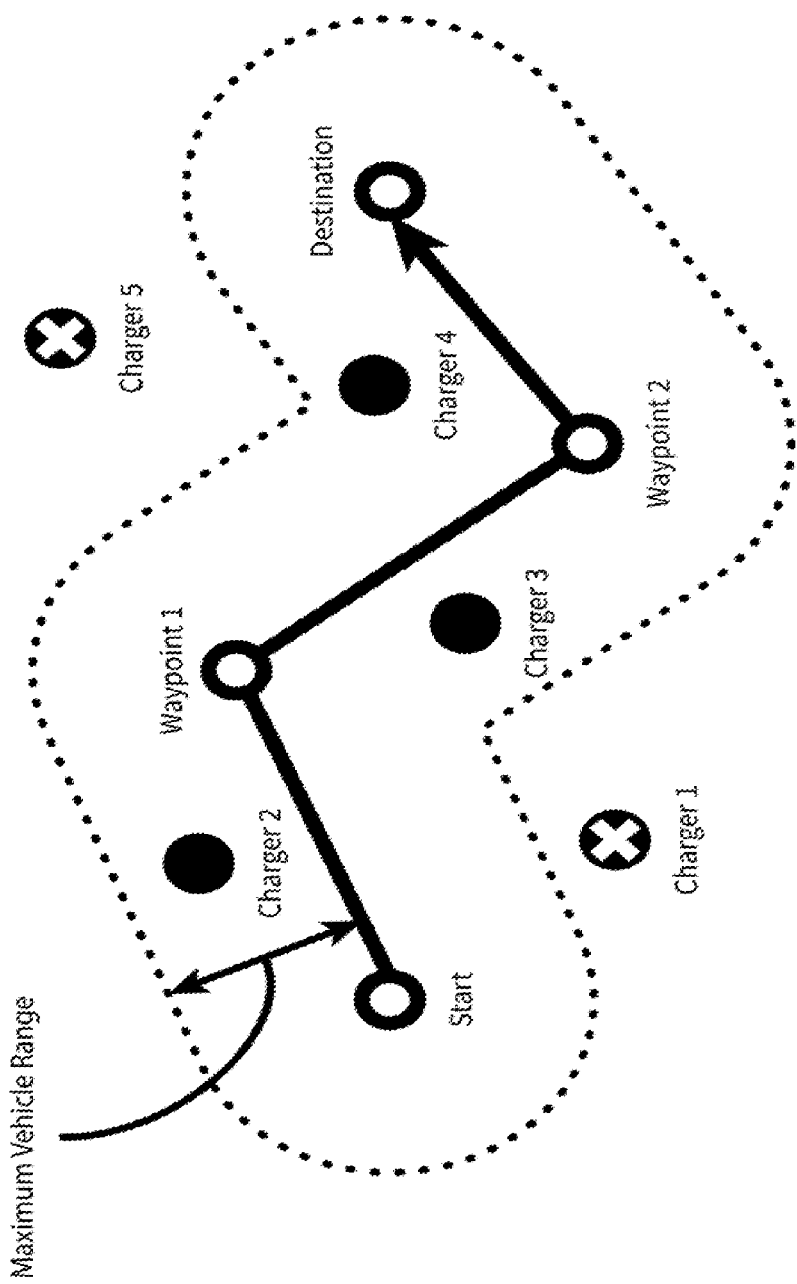
FIG. 3 shows a route plan according to embodiments.

FIG. 3 shows a route plan according to embodiments.

Embodiments reduce the computational cost of the route determination performed by route determination module 104 by ignoring electric vehicle battery charging location nodes which are unlikely to be relevant for a particular route.

In embodiments, the route determination module is configured to identify a subset of electric vehicle battery charging locations from the data retrieved from the charging network storage database and ignore the identified subset of electric vehicle battery charging locations for the purposes of the route determination.

In some embodiments, some or all of the electric vehicle battery charging location nodes which are greater than a predefined distance from the great circle lines between the start location, any waypoint locations and the destination location are not included in the route determination. The predetermined distance may for example comprise the theoretical maximum range of the vehicle.

In embodiments, electric vehicle battery charging locations in the identified subset are those electric vehicle battery charging locations which are greater than a predefined distance from the great circle lines between the start location, the at least one waypoint and the destination location. In embodiments, electric vehicle battery charging locations in the identified subset are those electric vehicle battery charging locations which are greater than a predefined distance from the great circle line between the start location and the destination location.

In embodiments, the distance of each electric vehicle battery charging location node from the lines between the start, waypoint and destination locations is calculated using a formula such as the haversine equation.

In the example embodiments depicted in FIG. 3, charge locations 1 and 5 are not considered by route determination module 104 during the route determination, only charge locations 2, 3 and 4 are considered.

In some scenarios, excluding electric vehicle battery charging location nodes in this way may lead to a less optimal route or will fail to find a route at all. These scenarios can be avoided by using a larger predetermined distance in embodiments. A smaller predetermined distance can be used to reduce route determination time.

In embodiments, the predetermined distance varies across the length of the desired journey. In some embodiments, the predetermined distance is calculated dynamically and varies across the length of the planned journey.

In embodiments, the predetermined distance is reduced where electric vehicle battery charging locations are located more densely and increased where electric vehicle battery charging locations are located more sparsely.

In some embodiments, the chargers are sorted by their minimum distance to one of the great circle lines of the planned journey the nearest charger locations are then included. In some embodiments, the number of charger locations to include could vary depending upon the length of the journey, for example two charger locations for every kilometer of the straight line length of the journey. A journey can for example be broken up into smaller segments, for example a 500 km journey could be broken up into five 100 km segments. In some such embodiments, the nearest charge locations are marked as included based upon their proximity to each segment and then the route determination proceeds using the set of all included charge node locations, as per the following example pseudocode:

```
allChargers = list of all charge node locations
lines = list of lines in route
segments = lines cut into segments up to 100km long
for each segment:
    len = segment length in km
    n = len * 2
    nearestChargers = nearest n chargers to this segment
    mark nearestChargers as included in calc
perform route calculation using allChargers elements which
have been marked as included in calc
```

In some embodiments, some or all of the route determination is performed offline (i.e. electric vehicle routing system 102 is unable to communicate externally to the vehicle for example with server 120 via wireless communication link 120C or otherwise). This may for example be the case where the electric vehicle routing system is installed entirely or at least as part of a vehicle's built-in systems. In such scenarios, the time taken to calculate the cost parameter details of the paths may be prohibitively high, for example calculating the cost parameter details from the start location to electric vehicle battery charging node locations, from waypoint locations to electric vehicle battery charging node locations and from the electric vehicle battery charging node locations to the destination.

In embodiments, some or all possible costs from any particular geographic location to any other geographic location are pre-calculated in such a way that these pre-calculated costs can be stored in a compact form on the vehicle and accessed rapidly even when the vehicle is offline.

First example embodiments do this by using for example the haversine (or other, e.g. Euclidean) distance between a particular geographic coordinate and the other and estimating the distance, time and any other costs based upon this direct distance. This can be improved by pre-computing many real costs between locations for a particular geographical area and using these to calculate a set of weights that can be applied to the raw haversine distance to create a prediction of cost parameters which most closely matches real world conditions.

In embodiments, the advance determining and/or calculating comprises computing the haversine distance between a particular geographic coordinate and another and estimating one or more of distance, time and other costs based upon the computed haversine distance.

In embodiments, the advance determining and/or calculating comprises computing cost parameters between locations for a particular geographical area and using these to calculate a set of weights that can be applied to computed haversine distances to create a prediction of cost parameters.

Second example embodiments do this by pre-calculating the real cost parameters between a candidate set of source locations and a candidate set of target locations. The route calculation can then be calculated using an estimate of the real cost parameters from point a to b by finding the nearest source location to a (say a'), the nearest target location to b (say b') and then returning the sum of the estimated cost from a to a', the pre-calculated cost from a' to b' and the estimated cost from b' to b.

In some embodiments, the set of start locations and candidate locations are chosen in order to reduce the pre-calculation time and the size of the pre-calculated route file without materially sacrificing the accuracy of the estimated real cost parameters. For example, source locations can be chosen as all geographical locations rounded to a certain number of decimal places where that location is within a certain distance of a road and/or certain key locations such as the location of chargers. The computation cost of finding the nearest source or target location can be reduced by using a data structure such as an R-Tree or some other suitable indexing scheme.

In embodiments, the advance determining and/or calculating comprises computing cost parameters between a candidate set of source locations and a candidate set of target locations, and estimating cost parameters from a given first candidate location to a given second candidate location on the basis of the nearest source location to the given first candidate location, the nearest target location to the given second candidate location, and a sum of an estimated cost from the given first candidate location, a pre-calculated cost from the nearest source location to the nearest target location, and an estimated cost from the nearest target location to the given first candidate location.

Third example embodiments do this by pre-calculating the real cost parameters between a number of source locations and target locations and then use these to train a machine learning model (such as for example a linear regression or a neural network) to predict the real cost parameters for any given source and target location. This trained model can then be installed in the vehicle and used to rapidly calculate estimates of the cost parameters between any two locations.

In embodiments, the advance determining and/or calculating comprises computing cost parameters between a number of source locations and target locations and using these to train a machine learning model.

In some such embodiments, a neural network is trained on real cost parameter data for example as follows:
Features (the input for training the model):
Source latitude in radians
Source longitude in radians
Target latitude in radians
Target longitude in radians
Haversine distance between source and target (which may be scaled to be between 0 and 1 by dividing by the maximum theoretical range of the vehicle)
Labels (the expected output of the trained model):
The ratio of the real distance to the haversine distance
The ratio of the real time to the haversine distance
The ratio of the real elevation change to the haversine distance
The ratio of other cost parameters to the haversine distance With a suitable loss function (such as mean squared error) an optimizer (such as Stochastic Gradient Descent (SGD) or Adam) can then be used to fit the neural network. Once the neural network has been trained in this way it can be deployed into the vehicle and used to estimate the cost parameters. If the embedded system is deployed to have one or more graphics processing units (GPUs) or other hardware acceleration for linear algebra then these can be used to accelerate the estimation of cost parameters and to calculate many cost parameters simultaneously.

Fourth example embodiments do this by pre-calculating the real cost parameters from a set of landmarks to all other locations. These landmarks are then used to estimate the real cost parameters from location a to location b.

In embodiments, the advance determining and/or calculating comprises computing cost parameters from a set of landmarks to all other locations and using these to estimate cost parameters from a given first other location to a given second other location.

Such embodiments may be implemented for example as per the following pseudocode:

```
a = start location
b = destination location
estimatedCost = 0
for each landmark:
    landmarkEstimatedCost = max(
        cost from landmark to b –
        cost from landmark to a,
        cost from a to landmark –
        cost from b to landmark)
    if landmarkEstimatedCost > estimatedCost
    then estimatedCost = landmarkEstimatedCost
```

Figure 4:
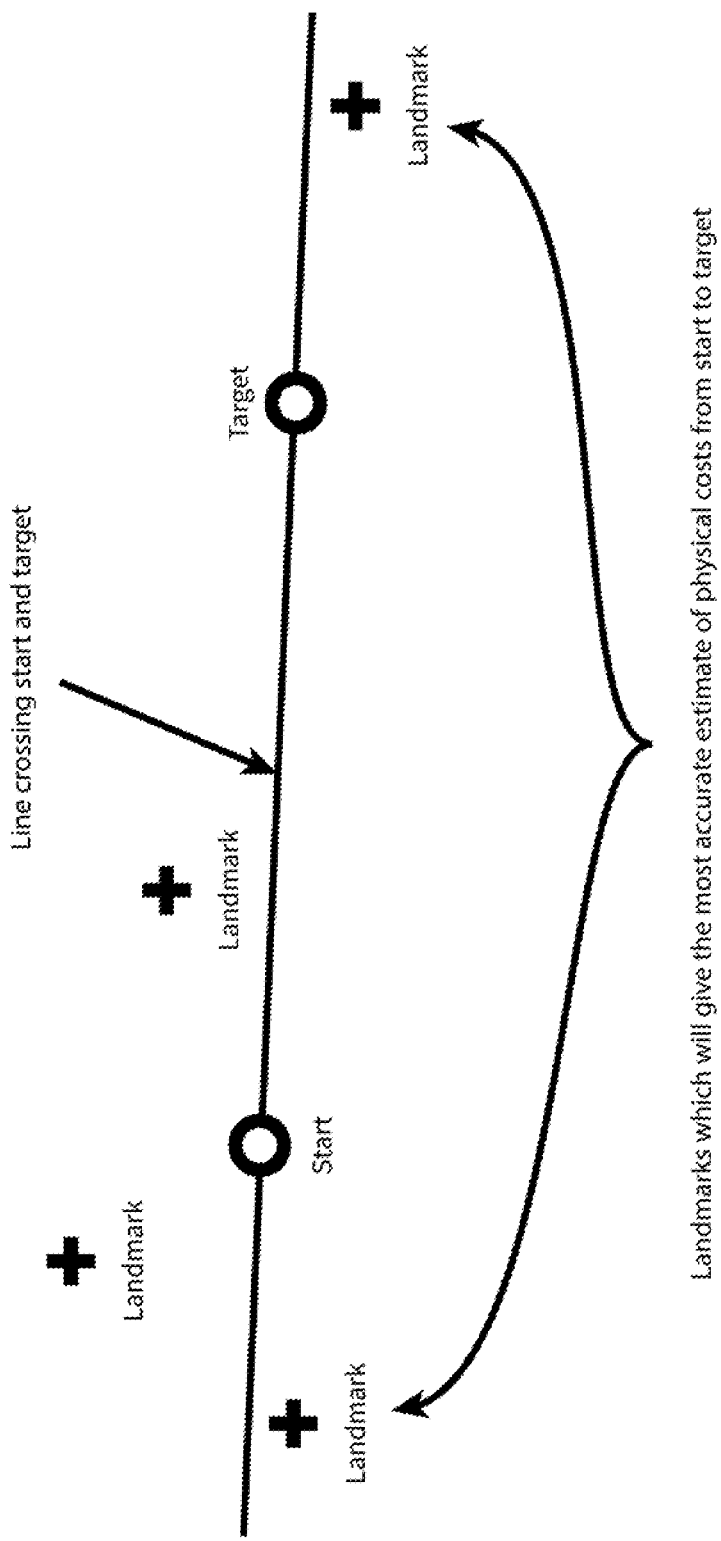
FIG. 4 shows a node network according to embodiments.

Landmarks produce accurate estimates if they are positioned close to a line which crosses the start location and the target location, and the projection of the landmark to the line is either before the start location or ahead of the target location on this line. Such embodiments are depicted in FIG. 4.

Any of the above described first, second, third and fourth embodiments for estimating the cost parameters can be used in combination.

For example, the first embodiments could be used to estimate the costs from a to a' and b to b' and the second embodiments used to estimate the costs from a' to b'.

For example, the third embodiments could be trained on, for example, latitude and longitude rounded to 1 decimal place (accurate to around 11 km) and then the costs calculated using the first embodiments between a and b and the same location rounded to 1 decimal place. As another example, the third embodiments can be trained on small distances, say up to 11 km to estimate the cost between a to a' and b to b'.

For example, the first embodiments can be used to calculate rapidly a potential route, then subsequently calculate a more accurate route using one of the second, third or fourth embodiments or a combination thereof. This would, for example, allow an indicative route to be shown to a user very rapidly followed by a confirmed route calculated using more accurately estimated cost parameters.

The term 'physical cost' used herein refers to the cost of traversing a particular edge between nodes and can include the distance travelled, time taken, changes in elevation, directions of travel, incidental charging, etc.

The term 'step' used herein can either refer to a 'travel' step or a 'charge then travel' step. The step includes the physical cost of the travel portion as well as the effect of any charging.

The term 'actual cost' used herein refers to the cost realized in the traversal of a number of steps, for example a step might consist of the vehicle starting with 50% charge, charging for a period of time and then travelling a certain distance under certain conditions.

The term 'vehicle state' used herein refers to a representation of the charge, battery temperature, etc. of a vehicle at the start of a trip and following a number of steps.

The term 'vehicle energy profile' used herein refers to the vehicle's maximum charge, the required charge at the target and the minimum buffer of required charge at each charging stop. For example, a user may want to ensure that there is always 5% of the charge left in the vehicle when it reaches a charging stop in order to account for inaccuracies in the predicted charge.

The node network referred to herein comprising the start location node, the target location node, one or more charging nodes and possibly one or more waypoint nodes is a representation of the physical costs of traversing from one node to any other node.

Embodiments described herein can calculate an optimal route as defined by an arbitrary fitness function (typically least time, but could also be least energy usage, least monetary cost, etc. or some combination thereof).

Embodiments described herein can route through an arbitrary number of charging stops and can route through an arbitrary number of waypoints.

Embodiments described herein can handle chargers with different rates of charging, can handle non-linear charge rates at chargers, and can handle different target levels of charge at the destination location node.

Embodiments described herein can predict the optimal route based upon the vehicle's starting conditions, e.g. partially charged, low battery temperature, etc.

Embodiments described herein can handle 'non-typical' scenarios, such as moving away from the destination location node in order to charge before proceeding where this provides the optimal route, proceeding past the target to have the required end charge, doubling back or visiting the same charger twice where this provides the optimal route via waypoints, and can model all parameters affecting energy utilization, such as wind direction, weather conditions, battery temperature throughout the trip, ascent/descent, etc.

Computational performance of embodiments described herein is proportional to the number of chargers$^2$ and the number of waypoints$^2$.

Embodiments described herein can be employed in resource constrained and embedded systems.

Embodiments described herein can handle different predicted wait times at chargers, so can support the balancing of charger utilization/congestion across the charger network.

Embodiments described herein can handle traffic and road closure details to modify optimal routes and route around obstacles.

Embodiments described herein can suggest routes which are more optimal if the vehicle is driven more slowly so as to reduce energy usage.

Embodiments described herein can handle routes which contain some innate charging element, such as induction charging roads.

Embodiments comprise an electric vehicle routing system comprising: a route determination module; an electric vehicle battery status monitoring module; a road network storage database for storing data associated with a road network; a charging network storage database for storing data associated with a plurality of electric vehicle battery charging locations in the road network; and a graphical user interface (GUI) module, the route determination module being configured to: receive, via the GUI module, user input data defining, for a desired journey of a vehicle in which the vehicle routing system is installed, a start location in the road network, and a destination location in the road network; receive, from the vehicle battery status monitoring module, at least one parameter associated with a status of a battery of the vehicle, the at least one received parameter indicating a current temperature of the battery; retrieve data from the road network storage database; retrieve data from the charging network storage database; on the basis of the received user input data, the data received from the vehicle battery status monitoring module, the data retrieved from the road network storage database and the data retrieved from the charging network storage database, determine at least one route in the road network from the start location to the destination location; and transmit data associated with the at least one determined route to the GUI module, the transmitted data being operable to cause the GUI module to display data indicative of the at least one determined route.

Embodiments comprise an electric vehicle routing system comprising: a route determination module; an electric vehicle battery status monitoring module; a road network storage database for storing data associated with a road network; a charging network storage database for storing data associated with a plurality of electric vehicle battery charging locations in the road network; and a graphical user interface (GUI) module, the route determination module being configured to: receive, via the GUI module, user input data defining, for a desired journey of a vehicle in which the vehicle routing system is installed, a start location in the road network, and a destination location in the road network; receive, from the vehicle battery status monitoring module, at least one parameter associated with a status of a battery of the vehicle; retrieve data from the road network storage database; retrieve data from the charging network storage database; on the basis of the received user input data, the data received from the vehicle battery status monitoring module, the data retrieved from the road network storage database and the data retrieved from the charging network storage database, determine at least one route in the road network from the start location to the destination location; and transmit data associated with the at least one determined route to the GUI module, the transmitted data being operable to cause the GUI module to display data indicative of the at least one determined route.

Embodiments comprise a device for determining routes in a road network, the device comprising: a route determination module: a wireless transceiver; and a graphical user interface (GUI) module, the GUI module being configured to receive user input data defining, for a desired journey, a start location in the road network, a destination location in the road network, the wireless transceiver being configured to: receive, at least one parameter associated with a status of a battery of a vehicle; receive data from a road network storage database; and receive data from a charging network storage database associated with a plurality of electric vehicle battery charging locations in the road network, the route determination module being configured to: on the basis of the received user input data, the received at least one vehicle battery status parameter, the data received from the road network storage database and the data received from the charging network storage database, determine at least one route in the road network from the start location to the destination location; and provide data associated with the at least one determined route to the GUI module, the provided data being operable to cause the GUI module to display data indicative of the at least one determined route.

The device may for example comprise a mobile ('cellular') telephone such as a smartphone. The route determination may be carried out at least in part by a computer program such as application software (an 'app') installed on the device. The wireless transceiver may for example comprise a wireless modem with Long Term Evolution (LTE) communications functionality which allows the route determination module to interrogate various external systems (such as road network and charging network storage databases and a vehicle battery status monitoring module/service) wirelessly in order to obtain the requisite data. In alternative embodiments, the device comprises a dedicated route determination device with no telephony capability. In embodiments, the device is capable of interfacing with one or more computer and/or navigation systems of a vehicle to facilitate route guidance/navigation of the vehicle.

Whilst the present disclosure has been described and illustrated with reference to particular embodiments, it will be appreciated by those of ordinary skill in the art that the disclosure lends itself to many different variations not specifically illustrated herein. By way of example only, certain possible variations will now be described.

Embodiments described herein are applicable to vehicles whose range may be lower than a journey and is particularly helpful in optimizing route planning where the charging stops are sparse and there is a mixture of slow and fast charging available across the route network. Whilst some of the features of embodiments described herein are particular to electric vehicles, embodiments can also be applied to hydrogen cells and other forms of power storage especially where the availability of charging and fueling points is low.

In embodiments, the network node space can be pruned when performing route finding by ignoring charge stops which will definitely not lead to a more optimal journey. For example, when identifying candidate next steps from a charging node, embodiments can ignore other charge nodes where they have the same or lower charge rate and have a higher cost to reach the destination location node.

In embodiments, a breadth first search algorithm such as Dijkstra is employed to calculate the cost from a given node to all other nodes in the node network. The breadth first search would typically be terminated once the destination location node has been reached. In embodiments, the Dijkstra breadth first search is modified to terminate once multiple target node have been reached. For example, finding the costs from the start to all of the charger nodes, waypoints and destination location node can be performed with a single Dijkstra search across the road/travel network until either all of the target nodes have been reached or the cost to a given node exceeds some other constraint such as the theoretical maximum range of the vehicle.

In embodiments, route determination module 104 determines the lowest cost route as defined by the fitness function given the starting vehicle state across a node network. In embodiments, route determination module 104 calculates a sequence of steps, both travelling from node to node and charging before travelling. In some embodiments, instead of transmitting results of its calculations for display on GUI module 112, route determination module 104 feeds some or all of its results to a conventional guidance system (not shown) for navigation.

In embodiments, calculating of cost for the steps from a node are queued and batched so that they can be executed in parallel. This allow calculation to be performed more rapidly on multi central processing unit (CPU)/core architectures, distributed computing and architectures designed for rapid sequential computation such as digital signal processors (DSPs), field-programmable gate arrays (FPGAs) and/or application-specific integrated circuits (ASICs). Where actual cost and charge rate calculations can be expressed as matrix operations they can be executed rapidly as bulk calculations on GPUs.

Some alternative embodiments employ relaxation methods where calculations related to electric vehicle battery charging locations involve leaving charge times variable within certain constraints. Embodiments then iteratively relax the charge times until a good solution is reached which still meets one or more relevant constraints.

Some alternative embodiments employ stochastic methods where routes are calculated by randomly perturbing a candidate route and retaining routes which meet one or more relevant constraints and are more optimal than previous routes.

Some alternative embodiments employ heuristic methods such as greedy search where routes are calculated by picking a set of routes based upon the nearest reachable charger to the start, destination, waypoint, some midpoint, etc.

Some alternative embodiments employ a discrete number of charge times, for example at each charging location consider charging for 10, 20, 30 minutes, etc.

Embodiments described herein need not be limited to use with electric vehicle routing. Embodiments can used for any routing problem for other types of vehicle such as ships, drones, autonomous robots, etc. Embodiments can be employed for example with vehicles with a range which is lower than the trip length and where recharging/refueling locations are relatively sparse.

Embodiments described herein relate to a vehicle with a single battery; embodiments may also be applied to vehicles with multiple batteries/cells. Such batteries/cells may be any type of battery/cell such as electric batteries, hydrogen fuel cells, etc.

Where in the foregoing description, integers or elements are mentioned which have known, obvious or foreseeable alternatives or equivalents, then such alternatives or equivalents are herein incorporated as if individually set forth. Reference should be made to the claims for determining the true scope of the present disclosure, which should be construed so as to encompass any such alternatives. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

What is claimed is:

1. An electric vehicle routing system, comprising:
   a route determination module;
   an electric vehicle battery status monitoring module;
   a road network storage database for storing data associated with a road network;
   a charging network storage database for storing data associated with a plurality of electric vehicle battery charging locations in the road network; and
   a graphical user interface (GUI) module,
   wherein the route determination module is configured to:
     receive, via the GUI module, user input data defining, for a desired journey of a vehicle in which the electric vehicle routing system is installed, a start location in the road network, a destination location in the road network, and at least one waypoint in the road network;
     receive, from the electric vehicle battery status monitoring module, at least one parameter associated with a status of a battery of the vehicle;
     retrieve data from the road network storage database;
     retrieve data from the charging network storage database;
     identify a first subset of electric vehicle battery charging locations from the data retrieved from the charging network storage database to be ignored for a route determination, and a second subset of electric vehicle battery charging locations from the data retrieved from the charging network storage database to be used for the route determination;

on the basis of the received user input data, the data received from the electric vehicle battery status monitoring module, the data retrieved from the road network storage database, and the second subset of electric vehicle battery charging locations from the data retrieved from the charging network storage database, determine at least one route in the road network from the start location to the destination location via the at least one waypoint; and transmit data associated with the at least one determined route to the GUI module, the transmitted data being operable to cause the GUI module to display data indicative of the at least one determined route.

2. The electric vehicle routing system according to claim 1, wherein in order to determine the at least one route in the road network, the route determination module is further configured to determine at least one first path from the start location to one or more electric vehicle battery charging locations in the plurality of electric vehicle battery charging locations.

3. The electric vehicle routing system according to claim 2, wherein in order to determine the at least one route in the road network, the route determination module is further configured to determine at least one second path from one or more electric vehicle battery charging locations in the plurality of electric vehicle battery charging locations to the destination location.

4. The electric vehicle routing system according to claim 3, wherein in order to determine the at least one route in the road network, the route determination module is further configured to determine at least one third path from one or more electric vehicle battery charging locations in the plurality of electric vehicle battery charging locations to one or more other electric vehicle battery charging locations in the plurality of electric vehicle battery charging locations.

5. The electric vehicle routing system according to claim 4, wherein in order to determine the at least one route in the road network, the route determination module is further configured to associate one or more cost parameters with the at least one first path, the at least one second path, and the at least one third path.

6. The electric vehicle routing system according to claim 5, wherein the one or more cost parameters comprise one or more of:
a distance travelled,
a time taken,
an elevation change, and
a distance travelled in one or more compass directions.

7. The electric vehicle routing system according to claim 5, wherein in order to determine the at least one route in the road network, the route determination module is further configured to:
determine a node network with edges between each node in the node network comprising at least the start location, one or more of the electric vehicle battery charging locations of the plurality of electric vehicle battery charging locations, and the destination location as nodes within the node network; and
calculate a minimum cost metric from a start location node in the node network to one or more other nodes in the node network by calculating one or more cost parameters associated with one or more edges in the node network between the start location node and the one or more other nodes in the node network.

8. The electric vehicle routing system according to claim 7, wherein in order to calculate a minimum cost metric, the route determination module is further configured to use, at least in part, a breadth first search process for each cost parameter.

9. The electric vehicle routing system according to claim 7, wherein in order to calculate a minimum cost metric, the route determination module is further configured to determine an initial charge energy of the battery of the vehicle.

10. The electric vehicle routing system according to claim 7, wherein in order to calculate a minimum cost metric, the route determination module is further configured to calculate a decrease in charge energy of the battery of the vehicle due to charge energy consumed when traversing each of the edges in the node network.

11. The electric vehicle routing system according to claim 7, wherein in order to calculate a minimum cost metric, the route determination module is further configured to calculate an increase in charge energy of the battery of the vehicle due to charge energy added when charging the battery at each of the one or more of the electric vehicle battery charging locations in the plurality of electric vehicle battery charging locations.

12. The electric vehicle routing system according to claim 7, wherein in order to calculate a minimum cost metric, the route determination module is further configured to determine one or more parameters associated with a current state of the vehicle.

13. The electric vehicle routing system according to claim 12, wherein the one or more parameters associated with a current state of the vehicle comprise one or more of:
a vehicle battery temperature,
an elevation change,
a wind direction, and
an ambient temperature.

14. The electric vehicle routing system according to claim 7, wherein in order to calculate a minimum cost metric, the route determination module is further configured to identify one or more edges on a lowest cost route from the start location node to each other node in the node network.

15. The electric vehicle routing system according to claim 7, wherein in order to calculate a minimum cost metric, the route determination module is further configured to:
dynamically calculate which of the edges in the node network are viable and which of the edges are not viable; and
prune any edge of the edges in the node network that is not viable from the node network.

16. The electric vehicle routing system according to claim 15, wherein in order to dynamically calculate which of the edges in the node network are viable and which of the edges in the node network are not viable, the route determination module is further configured to, for each respective edge in the node network from a given electric vehicle battery charging location node to another node in the node network:
determine that the respective edge is not viable if a charge energy consumed from the given electric vehicle battery charging location node to the another node via the respective edge is greater than a maximum charge energy of an electric vehicle battery minus a minimum allowed charge energy for the electric vehicle battery.

17. The electric vehicle routing system according to claim 16, wherein the route determination module is further configured to:
determine that the respective edge is not viable without charging if the charge energy consumed from the given electric vehicle battery charging location node to the another node via the respective edge is greater than a current predicted charge energy of the electric vehicle battery minus the minimum allowed charge energy for the electric vehicle battery.

18. The electric vehicle routing system according to claim 17, wherein the route determination module is further configured to determine that the respective edge is viable if the charge energy consumed from the given electric vehicle battery charging location node to the another node via the respective edge is less than the maximum charge energy of the electric vehicle battery minus a minimum allowed charge energy for the electric vehicle battery, or if the charge energy consumed from the given electric vehicle battery charging location node to the another node via the respective edge is les than a current predicted charge energy of the electric vehicle battery minus the minimum allowed charge energy for the electric vehicle battery.

19. The electric vehicle routing system according to claim 17, wherein:
the given electric vehicle battery charging location node is associated with a first charger and the another node is associated with a second charger,
the first charger is configured to charge at a faster rate than the second charger, and
in response to a determination that the charge energy consumed from the given electric vehicle battery charging location node to the another node via the respective edge is greater than a current predicted charge energy of an electric vehicle battery minus the minimum allowed charge energy for the electric vehicle battery, the route determination module is further configured to:
create an additional node in the node network comprising a copy of the another node;
create an additional viable edge in the node network from the given electric vehicle battery charging location node to the additional node; and
allocate, to the additional viable edge, a cost equal to a cost of charging the electric vehicle battery to full charge energy plus the charge energy consumed traversing from the given electric vehicle battery charging location node to the another node.

20. The electric vehicle routing system according to claim 17, wherein in order to dynamically calculate which of the edges in the node network are viable and which of edges in the node network are not viable, the route determination module is further configured to, for each respective edge from a given non-electric vehicle battery charging location node to another node in the node network:
determine the respective edge is not viable if the charge energy consumed from the given non-electric vehicle battery charging location node to the another node via the respective edge is greater than a current predicted charge energy of the electric vehicle battery minus the minimum allowed charge energy for the electric vehicle battery; and
determine that the respective edge is viable if the charge energy consumed from the given non-electric vehicle battery charging location node to the another node via the respective edge is less than a current predicted charge energy of the electric vehicle battery minus the minimum allowed charge energy for the electric vehicle battery.

21. The electric vehicle routing system according to claim 16, wherein the minimum allowed charge energy for the electric vehicle battery is defined according to received user input data.

22. The electric vehicle routing system according to claim 7, wherein in order to calculate a minimum cost metric, the route determination module is further configured to determine a predicted time taken to wait for a vehicle battery charger to become available at the one or more of the electric vehicle battery charging locations in the plurality of electric vehicle battery charging locations.

23. The electric vehicle routing system according to claim 7, wherein in order to calculate a minimum cost metric, the route determination module is further configured to allocate a cost penalty for each electric vehicle battery charging location node in the node network.

24. The electric vehicle routing system according to claim 16, wherein the route determination module is further configured to:
prior to receipt of the user input data, perform a partial determination of the at least one route and/or a partial calculation of the minimum cost metric; and
after receipt of the user input data, perform the determination of the at least one route based on the partial determination of the at least one route and/or perform the calculation of the minimum cost metric based on the partial calculation of the minimum cost metric.

25. The electric vehicle routing system according to claim 7, wherein in order to determine the at least one route in the road network, the route determination module is further configured to determine a plurality of edges in the node network from a source location node to one or more copies of a destination location node with different time costs based upon one or more maximum speeds which the vehicle should not exceed.

26. The electric vehicle routing system according to claim 25, wherein the one or more maximum speeds are lower than a legal speed limit for at least an edge of the node network.

27. The electric vehicle routing system according to claim 7, wherein in order to determine the at least one route in the road network, the route determination module is further configured to:
represent the at least one waypoint as a waypoint node in the node network; and
determine at least one fourth path to a destination location node via the waypoint node.

28. The electric vehicle routing system according to claim 27, wherein in order to determine the at least one route in the road network, the route determination module is further configured to determine at least one fifth path to one or more electric vehicle battery charging location nodes via the waypoint node.

29. The electric vehicle routing system according to claim 28, wherein in order to determine the at least one route in the road network, the route determination module is further configured to:
create one or more copies of one or more electric vehicle battery charging location nodes dynamically based upon whether the waypoint node has been traversed or not; and
determine at least one sixth path to one or more other nodes from the one or more copies of the one or more electric vehicle battery charging location nodes.

30. The electric vehicle routing system according to claim 29, wherein:
the received user input data defines a plurality of waypoints, and
in order to determine the at least one route in the road network, the route determination module is further configured to:

represent one or more other waypoints of the plurality of waypoints as one or more other waypoint nodes in the node network; and determine at least one seventh path from the waypoint node to the one or more other waypoint nodes.

31. The electric vehicle routing system according to claim 1, wherein electric vehicle battery charging locations in the identified subset are those electric vehicle battery charging locations which are greater than a predetermined distance from a great circle lines between the start location, the at least one waypoint, and the destination location.

32. The electric vehicle routing system according to claim 31, wherein the predetermined distance comprises a theoretical maximum range of the vehicle.

33. The electric vehicle routing system according to claim 31, wherein the predetermined distance varies across a length of the desired journey.

34. The electric vehicle routing system according to claim 33, wherein the predetermined distance is reduced where electric vehicle battery charging locations are located more densely and increased where electric vehicle battery charging locations are located more sparsely.

35. The electric vehicle routing system according to claim 24, wherein in order to perform the partial determination and/or the partial calculation, the route determination module is further configured to:
compute a haversine distance between a first geographic coordinate and a second geographic coordinate; and
estimate one or more of a distance, a time, and an other cost between the first geographic coordinate and the second geographic coordinate based upon the computed haversine distance.

36. The electric vehicle routing system according to claim 24, wherein in order to perform the partial determination and/or the partial calculation, the route determination module is further configured to:
compute cost parameters between locations for a particular geographical area; and
calculate a set of weights based on the computed cost parameters,
wherein the set of weights is configured to be applied to computed haversine distances to create a prediction of cost parameters.

37. The electric vehicle routing system according to claim 24, wherein in order to perform the partial determination and/or the partial calculation, the route determination module is further configured to:
compute cost parameters between a candidate set of source locations and a candidate set of target locations; and
estimate cost parameters from a given first candidate location to a given second candidate location on the basis of:
a nearest source location to the given first candidate location, a nearest target location to the given second candidate location, a sum of an estimated cost from the given first candidate location, a pre-calculated cost from the nearest source location to the nearest target location, and an estimated cost from the nearest target location to the given first candidate location.

38. The electric vehicle routing system according to claim 24, wherein in order to perform the partial determination and/or the partial calculation, the route determination module is further configured to:
compute cost parameters between a number of source locations and target locations; and
use the computed cost parameters to train a machine learning model.

39. The electric vehicle routing system according to claim 24, wherein in order to perform the partial determination and/or the partial calculation, the route determination module is further configured to:
compute cost parameters from a set of landmarks to all other locations; and
use the computed cost parameters to estimate cost parameters from a given first other location to a given second other location.

40. A method of operating an electric vehicle routing system,
the electric vehicle routing system comprising:
a route determination module;
an electric vehicle battery status monitoring module;
a road network storage database for storing data associated with a road network;
a charging network storage database for storing data associated with a plurality of electric vehicle battery charging locations in the road network; and
a graphical user interface (GUI) module, and
the method comprising, at the route determination module:
receiving, via the GUI module, user input data defining, for a desired journey of a vehicle in which the vehicle routing system is installed, a start location in the road network, a destination location in the road network, and at least one waypoint in the road network;
receiving, from the electric vehicle battery status monitoring module, at least one parameter associated with a status of a battery of the vehicle;
retrieving data from the road network storage database;
retrieving data from the charging network storage database;
identifying a first subset of electric vehicle battery charging locations from the data retrieved from the charging network storage database to be ignored for a route determination, and a second subset of electric vehicle battery charging locations from the data retrieved from the charging network storage database to be used for the route determination;
on the basis of the received user input data, the data received from the electric vehicle battery status monitoring module, the data retrieved from the road network storage database, and the second subset of electric vehicle battery charging locations from the data retrieved from the charging network storage database, determining at least one route in the road network from the start location to the destination location via the at least one waypoint; and
transmitting data associated with the at least one determined route to the GUI module, the transmitted data being operable to cause the GUI module to display data indicative of the at least one determined route.

41. A non-transitory, computer-readable medium comprising a set of instructions, which, when executed by processor of a computerized device, cause the computerized device to perform a method of operating an electric vehicle routing system,
the electric vehicle routing system comprising:
a route determination module;
an electric vehicle battery status monitoring module;
a road network storage database for storing data associated with a road network;
a charging network storage database for storing data associated with a plurality of electric vehicle battery charging locations in the road network; and
a graphical user interface (GUI) module, and the method comprising, at the route determination module:

receiving, via the GUI module, user input data defining, for a desired journey of a vehicle in which the electric vehicle routing system is installed, a start location in the road network, a destination location in the road network, and at least one waypoint in the road network;

receiving, from the electric vehicle battery status monitoring module, at least one parameter associated with a status of a battery of the vehicle;

retrieving data from the road network storage database;

retrieving data from the charging network storage database;

identifying a first subset of electric vehicle battery charging locations from the data retrieved from the charging network storage database to be ignored for a route determination, and a second subset of electric vehicle battery charging locations from the data retrieved from the charging network storage database to be used for the route determination;

on the basis of the received user input data, the data received from the electric vehicle battery status monitoring module, the data retrieved from the road network storage database, and the second subset of electric vehicle battery charging locations from the data retrieved from the charging network storage database, determining at least one route in the road network from the start location to the destination location via the at least one waypoint; and transmitting data associated with the at least one determined route to the GUI module, the transmitted data being operable to cause the GUI module to display data indicative of the at least one determined route.

42. An electric vehicle routing system, comprising:
a route determination module;
an electric vehicle battery status monitoring module;
a road network storage database for storing data associated with a road network;
a charging network storage database for storing data associated with a plurality of electric vehicle battery charging locations in the road network; and
a graphical user interface (GUI) module,
the route determination module being configured to:
receive, via the GUI module, user input data defining, for a desired journey of a vehicle in which the electric vehicle routing system is installed, a start location in the road network and a destination location in the road network;
receive, from the electric vehicle battery status monitoring module, at least one parameter associated with a status of a battery of the vehicle, the at least one received parameter indicating a current temperature of the battery;
retrieve data from the road network storage database;
retrieve data from the charging network storage database;
identify a first subset of electric vehicle battery charging locations from the data retrieved from the charging network storage database to be ignored for a route determination, and a second subset of electric vehicle battery charging locations from the data retrieved from the charging network storage database to be used for the route determination;
on the basis of the received user input data, the data received from the electric vehicle battery status monitoring module, the data retrieved from the road network storage database, and the second subset of electric vehicle battery charging locations from the data retrieved from the charging network storage database, determine at least one route in the road network from the start location to the destination location; and
transmit data associated with the at least one determined route to the GUI module, the transmitted data being operable to cause the GUI module to display data indicative of the at least one determined route.

43. An electric vehicle routing system comprising:
a route determination module;
an electric vehicle battery status monitoring module;
a road network storage database for storing data associated with a road network;
a charging network storage database for storing data associated with a plurality of electric vehicle battery charging locations in the road network; and
a graphical user interface (GUI) module,
wherein the route determination module is configured to:
receive, via the GUI module, user input data defining, for a desired journey of a vehicle in which the electric vehicle routing system is installed, a start location in the road network, and a destination location in the road network;
receive, from the electric vehicle battery status monitoring module, at least one parameter associated with a status of a battery of the vehicle;
retrieve data from the road network storage database;
retrieve data from the charging network storage database;
identify a first subset of electric vehicle battery charging locations from the data retrieved from the charging network storage database to be ignored for a route determination, and a second subset of electric vehicle battery charging locations from the data retrieved from the charging network storage database to be used for the route determination;
on the basis of the received user input data, the data received from the electric vehicle battery status monitoring module, the data retrieved from the road network storage database, and the second subset of electric vehicle battery charging locations from the data retrieved from the charging network storage database, determine at least one route in the road network from the start location to the destination location; and
transmit data associated with the at least one determined route to the GUI module, the transmitted data being operable to cause the GUI module to display data indicative of the at least one determined route.

44. A device for determining routes in a road network, the device comprising:
a route determination module;
a wireless transceiver; and
a graphical user interface (GUI) module,
the GUI module being configured to receive user input data defining, for a desired journey, a start location in the road network and a destination location in the road network,
the wireless transceiver being configured to:
receive, at least one parameter associated with a status of a battery of a vehicle;
receive data from a road network storage database; and
receive data from a charging network storage database associated with a plurality of electric vehicle battery charging locations in the road network,
the route determination module being configured to:
identify a first subset of electric vehicle battery charging locations from the data retrieved from the charging network storage database to be ignored for a route determination, and a second subset of electric vehicle battery charging locations from the data retrieved from the charging network storage database to be used for the route determination;

on the basis of the received user input data, the received at least one vehicle battery status parameter, the data received from the road network storage database, and the second subset of electric vehicle battery charging locations from the data received from the charging network storage database, determine at least one route in the road network from the start location to the destination location; and provide data associated with the at least one determined route to the GUI module, the provided data being operable to cause the GUI module to display data indicative of the at least one determined route.

\* \* \* \* \*